Patented June 13, 1950

2,511,653

UNITED STATES PATENT OFFICE

2,511,653

PREPARATION OF ALPHA-METHOXY PROPIONITRILE

Edwin William Shand, Pittsburgh, Pa., assignor to Sinclair Refining Company, New York, N. Y., a corporation of Maine No Drawing. Application October 30, 1948, Serial No. 57,615

2 Claims. (Cl. 260—465.6)

My invention relates to improvements in the preparation of alpha methoxy nitriles such as alpha methoxy propionitrile, and, more particularly, to a method of preparing alpha methoxy nitriles by reacting an aliphatic nitrile and paraformaldehyde, or nascent anhydrous formaldehyde, in the presence of a dehydration catalyst at elevated temperatures.

When an organic cyanide is reacted with a compound such as formaldehyde, in the presence of a dehydration-type catalyst, at elevated temperatures, an unsaturated cyanide is formed. Such a process is disclosed in Brant et al. U. S. Patent No. 2,386,586, wherein formaldehyde as Formalin and propionitrile are reacted over a dehydration agent, such as alumina or silica gel at 350°–750° F. and an 80 to 88% yield of methacrylonitrile is recovered.

I have now discovered, however, that anhydrous formaldehyde, when reacted with a nitrile such as propionitrile in the presence of a difficultly reducible oxide of a metal of group II, III or IV of the periodic table, e. g., alumina, at elevated temperatures yields an alpha methoxy nitrile in contrast to expectations based upon the general experience of the art. For example, I have found that when paraformaldehyde is used as an in situ source of formaldehyde and dispersed in liquid propionitrile and the slurry is reacted over alumina as catalyst at a temperature within the range approximating 350°–685° F., preferably about 400°–500° F., alpha methoxy propionitrile is produced in good yields.

The anhydrous formaldehyde thus is generated in the reactor vessel when the slurry of paraformaldehyde and propionitrile is heated in the presence of the alumina catalyst. The nascent gas then reacts in situ with the propionitrile to form alpha methoxy propionitrile.

I have found, in unexpected contrast, that if the process is conducted by charging the formaldehyde as a gas in the monomeric state, e. g., by preheating the paraformaldehyde to, say, 220°–575° F., and passing the gas so formed through a heated tube to the reactor vessel, the reaction does not go. It appears therefore that the formaldehyde must be generated in contact with the catalyst and propionitrile.

The temperature of the reaction should be sufficient to generate anhydrous formaldehyde in considerable quantity from the paraformaldehyde. Thus a minimum temperature of about 212° F. to a maximum of about 800° F. is indicated, although in actual practice I have found elevated temperatures of the order of 350°–685° F. desirable and prefer temperatures of about 400°–500° F. In addition, a more satisfactory conversion is effected when the slurry of paraformaldehyde and nitrile is preheated to temperatures in the range of 360°–510° F., depending upon the particular reaction chamber temperature employed.

Further details respecting my invention will be apparent from the following examples which are set forth primarily for the purpose of illustrating useful embodiments of my improved process. The examples illustrate once-through operation but obviously higher yields result from modification for repeated contacting.

Example I 21.5 gms. of paraformaldehyde were added to 80.1 gms. of propionitrile to form a slurry in which the paraformaldehyde was kept in suspension by a motor-driven stirrer. The solution was preheated to 360°–375° F. and then fed over a period of one hour into a reactor vessel containing a catalyst bed of 50 cc. of alumina, so heated that the temperature of the bottom of the alumina bed varied between 370°–460° F. and the temperature of the top between 375°–390° F. over the reaction period.

At the end of the one hour period the total feed was 90.5 gms., and 8.5 gms. of solids and 41.5 gms. of liquid, principally alpha methoxy propionitrile, were recovered. The liquid also contained some traces of unreacted paraformaldehyde and propionitrile, but no methacrylonitrile was found.

The boiling point of the liquid recovered was 86°–123° C., with 80% boiling at 119°–122° C. The refractive index at 20° C. was 1.3935, and the density (20°/4°) was 0.8973. The percentage nitrogen found was 16.7.

Example II

This run was performed in the same manner as Example I, except that all of a dispersion of 45.0 gms. of paraformaldehyde in 96.5 gms. of propionitrile, preheated to 490°–510° F., was fed into the reactor vessel containing an alumina catalyst bed of 50 cc. over a period of 1¾ hours. The top temperature of the bed was varied between 510°–695° F., and the bottom between 490°–685° F. The tendency of ungasified paraformaldehyde to plug the reaction system was reduced at these temperatures.

At the end of 1¾ hours, 11.0 gms. of the solids and 30.2 gms. of the alpha methoxy propionitrile liquid were recovered. In addition, 8.0 gms. of water were produced in the conversion, indicating the occurrence of some dehydration. No methacrylonitrile was found in the liquid product, but the solid residue remaining in the reactor contained a polymeric material soluble in alcohol. Accordingly, it appears that under the conditions of this run a minor amount of dehydration and polymerization of the unsaturated product occurred. I conclude that the more moderate conditions of temperature favor the production of alpha methoxy propionitrile although higher temperatures promote ease of manipulation by maintaining the reactants and products in fluid form.

The liquid recovered boiled over the range, 67°–122° C., with 57% boiling between 119°–122° C.

The material boiling between 118°–122° C. for both runs was composited and the methyl ester was prepared. A comparison of its physical characteristics with those found in the literature are tabulated below:

| Methyl Ester | Boiling Point, °C. | Refractive Index at 20° C. |
|---|---|---|
| Found | 129.2–129.8 | 1.3971 |
| Literature Data | 129.5–129.8 | 1.3968 |

The reaction illustrated in the examples is applicable to other aliphatic nitriles including alicyclic nitriles and polynitriles such as succinonitrile. For example, approximately equimolar proportions of say acetonitrile, butyronitrile or cyclohexane carbonitrile and paraformaldehyde are reacted to produce the corresponding alpha methoxy derivatives. In the case of solid nitriles, an appropriate inert solvent, e. g. hexane, is advantageously employed in the preparation of the reaction mixture. Further, for the alumina catalyst of the examples, other difficultly reducible oxides of metals of groups II, III, and IV of the periodic table such as thoria, zirconia, beryllia are useful. I have found, however, that the reaction does not appear to proceed with the well known non-metallic dehydration catalyst, silica gel. Variations in the reaction conditions and manipulative procedure are permissible as indicated to the art by the nature of the starting nitrile, the catalyst, or the presence of solvent.

Alpha methoxy propionitrile is valuable as a fungicide, insecticide, and the alpha methoxy nitriles generally have utility as solvents and intermediates in organic synthesis. My invention thus provides a new reaction mechanism under dehydration conditions, and provides for the production of alpha methoxy nitriles by an improved and unexpected means.

I claim:

1. In the preparation of alpha methoxy propionitrile the improvement which consists of reacting a slurry of paraformaldehyde and propionitrile in the presence of alumina at a temperature in the range approximating 350° to 685° F.

2. The process which comprises reacting nascent anhydrous formaldehyde with propionitrile in the presence of alumina at a temperature in the range approximating 350° to 685° F., and recovering alpha methoxy propionitrile from the reaction products.

EDWIN WILLIAM SHAND.

REFERENCES CITED

The following references are of record in the file of this patent:

UNITED STATES PATENTS

| Number | Name | Date |
|---|---|---|
| 2,285,948 | Rust | June 9, 1942 |
| 2,386,586 | Brant et al. | Oct. 9, 1945 |